(12) United States Patent
Cheng

(10) Patent No.: US 9,637,155 B1
(45) Date of Patent: May 2, 2017

(54) LOCKING MECHANISM AND METHOD FOR OPENING AND FOLDING BABY STROLLER

(71) Applicant: Pao-Hsien Cheng, Tainan (TW)

(72) Inventor: Pao-Hsien Cheng, Tainan (TW)

(*) Notice: Subject to any disclaimer, the term of this patent is extended or adjusted under 35 U.S.C. 154(b) by 0 days.

(21) Appl. No.: 15/051,912

(22) Filed: Feb. 24, 2016

(51) Int. Cl.
| | | |
|---|---|---|
| *B62B 7/06* | (2006.01) | |
| *B62B 7/08* | (2006.01) | |
| *F16B 7/22* | (2006.01) | |
| *B62B 9/14* | (2006.01) | |
| *B62B 9/12* | (2006.01) | |
| *B62B 9/20* | (2006.01) | |

(52) U.S. Cl.
CPC ............. *B62B 7/08* (2013.01); *F16B 7/22* (2013.01); *B62B 9/12* (2013.01); *B62B 9/142* (2013.01); *B62B 9/20* (2013.01)

(58) Field of Classification Search
CPC  B62B 7/06; B62B 7/064; B62B 7/066; B62B 7/068; B62B 7/08; B62B 7/083; B62B 7/086; B62B 7/10; B62B 7/062; B62B 9/20
See application file for complete search history.

(56) References Cited

U.S. PATENT DOCUMENTS

| | | | | |
|---|---|---|---|---|
| 5,257,799 A * | 11/1993 | Cone | ................. | B62B 5/04 280/47.36 |
| 5,645,293 A * | 7/1997 | Cheng | ................. | B62B 7/08 280/47.36 |
| 6,102,432 A * | 8/2000 | Cheng | ................. | B62B 7/062 280/47.36 |
| 6,312,005 B1 * | 11/2001 | Lin | ................. | B62B 7/08 16/405 |
| 7,281,732 B2 * | 10/2007 | Fox | ................. | B62B 9/245 280/642 |
| 7,641,216 B2 * | 1/2010 | Cone, II | ................. | B62B 7/068 280/42 |
| 8,141,895 B2 * | 3/2012 | Haut | ................. | B62B 7/08 280/642 |
| 8,240,698 B2 * | 8/2012 | Tsai | ................. | B62B 7/064 280/42 |

(Continued)

FOREIGN PATENT DOCUMENTS

| | | |
|---|---|---|
| TW | M288610 U | 3/2006 |
| TW | M312478 U | 5/2007 |

(Continued)

*Primary Examiner* — Hau Phan
*Assistant Examiner* — Jacob Meyer
(74) *Attorney, Agent, or Firm* — Rosenberg, Klein & Lee

(57) ABSTRACT

A locking mechanism for opening and folding a baby stroller and a locking method therefor are revealed. The baby stroller includes an outer tube of a handle, a front wheel frame, and a rear wheel frame, each of which is arranged with a pivot member for connection. An inner tube is mounted and moveable in the outer tube and a push button for folding is arranged therebetween. A locking hook and a locking rod are pivotally connected to the pivot member of the outer tube and the pivot member of the rear wheel frame respectively. The handle, the front and the rear wheel frames are extended and fixed by the locking hook hooked onto the locking rod. While operating the push button for retracting the inner tube into the outer tube, the locking hook is released from the locking rod so that the baby stroller is folded.

4 Claims, 9 Drawing Sheets

(56) References Cited

U.S. PATENT DOCUMENTS

| | | | | |
|---|---|---|---|---|
| 8,585,075 B2* | 11/2013 | Zhong | B60N 2/2845 | 280/47.38 |
| 8,696,015 B2* | 4/2014 | Karremans | B62B 7/062 | 280/642 |
| 8,696,016 B2* | 4/2014 | Homan | B62B 7/105 | 280/47.34 |
| 8,998,241 B1* | 4/2015 | Cheng | B62B 7/062 | 280/47.38 |
| 9,050,993 B2* | 6/2015 | Pollack | B62B 9/12 | |
| 9,421,991 B2* | 8/2016 | Driessen | B62B 7/08 | |
| 9,540,028 B2* | 1/2017 | Taylor | B62B 7/10 | |
| 2001/0040357 A1* | 11/2001 | Barrett | B62B 7/145 | 280/648 |
| 2008/0106070 A1* | 5/2008 | Lan | B62B 7/10 | 280/647 |
| 2010/0127480 A1* | 5/2010 | Ahnert | B62B 7/08 | 280/647 |
| 2011/0181026 A1* | 7/2011 | Yeh | B62B 7/062 | 280/650 |
| 2016/0144879 A1* | 5/2016 | Storm | B62B 7/083 | 280/650 |

FOREIGN PATENT DOCUMENTS

| | | |
|---|---|---|
| TW | M319208 U | 9/2007 |
| TW | M407192 U | 7/2011 |
| TW | I429550 B | 3/2014 |
| TW | M474677 U | 3/2014 |

* cited by examiner

LOCKING MECHANISM AND METHOD FOR OPENING AND FOLDING BABY STROLLER

BACKGROUND OF THE INVENTION

Field of the Invention

The present invention relates to a locking mechanism for opening and folding a baby stroller and a locking method therefor, especially to a locking mechanism for opening and folding a baby stroller and a locking method for opening and folding a baby stroller by which the opened or folded baby stroller is locked for collection, storage, and transportation.

Descriptions of Related Art

The foldable baby stroller with four wheels can be divided into two groups. First group is a baby stroller folded in both horizontal and vertical directions. A seat of the baby stroller is generally formed by soft fabric and a foldable frame, as those revealed in Taiwanese Publication No. M474677 U "Foldable structure for stroller", Taiwanese Publication No. M319208 U "Collapsible stroller frame" and Taiwanese Publication No. M319208 U "Foldable baby stroller". The other group is folded in only the vertical direction. The seat of the stroller is generally a hard-shell type, as those revealed in Taiwanese Publication No. 1429550 B "Collapsible stroller apparatus", Taiwanese Publication No. M312478 U "Foldable baby stroller frame" and Taiwanese Publication No. M288610 U "Collapsible framework structure for infant jogging stroller". The present invention improves the baby stroller foldable in vertical direction.

SUMMARY OF THE INVENTION

Therefore it is a primary object of the present invention to provide a locking mechanism for opening and folding a baby stroller by which the baby stroller is opened and folded easily and a locking method therefor. Thus the baby stroller with a simpler structure is more convenient in use.

In order to achieve the above object, a locking mechanism for opening and folding a baby stroller according to the present invention includes an outer tube of a handle, a front wheel frame, and a rear wheel frame, each of which is arranged with a first pivot member, a second pivot member and a third pivot member respectively. The second pivot member of the front wheel frame is mounted into a front part of the first pivot member of the outer tube while the third pivot member of the rear wheel frame is mounted into a middle part and a rear part of the first pivot member of the outer tube. A front part of a side piece is coaxially connected to at least one side of the first pivot member of the outer tube and the second pivot member of the front wheel frame while a middle part of the side piece is coaxially connected to a front part of the third pivot member of the rear wheel frame. A rear part of the side piece is coaxially connected to the rear wheel frame and a rear part of the third pivot member of the rear wheel frame. A middle part of a locking hook is pivotally connected to a stopping frame of the first pivot member of the outer tube and a first end of the locking hook is extended into the outer tube. A second end of the locking hook can be hooked on a locking rod correspondingly while the locking rod is disposed on the third pivot member of the rear wheel frame. The handle further includes an inner tube mounted and movable in the outer tube. A push button for folding is arranged between the outer tube and the inner tube. The inner tube is moved downward in the outer tube until a bottom end of the inner tube presses the first end of the locking hook. Thus the second end of the locking hook is released from the locking rod and the baby stroller can be folded. When the baby stroller is opened to use, the stopping frame of the first pivot member of the outer tube is engaged with the third pivot member of the rear wheel frame so as to increase the locking strength of the baby stroller being opened backward.

A locking method for opening and folding a baby stroller is disclosed. The baby stroller includes a handle having an inner tube and an outer tube. The inner tube is moveable in the outer tube and fixed in the outer tube under control of a push button for folding. When the baby stroller is unlocked by the push button for folding, the inner tube is moveable downward until a bottom end of the inner tube presses a first end of a locking hook. Thus a second end of the locking hook, opposite to the first end, is released from a locking rod of a rear wheel frame and the baby stroller is able to be folded. When the baby stroller is opened to use, the second end of the locking hook is hooked onto the locking rod while a stopping frame of the outer tube and the rear wheel frame are engaged with and stopped by each other so as to increase locking strength of the baby stroller being opened backward.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
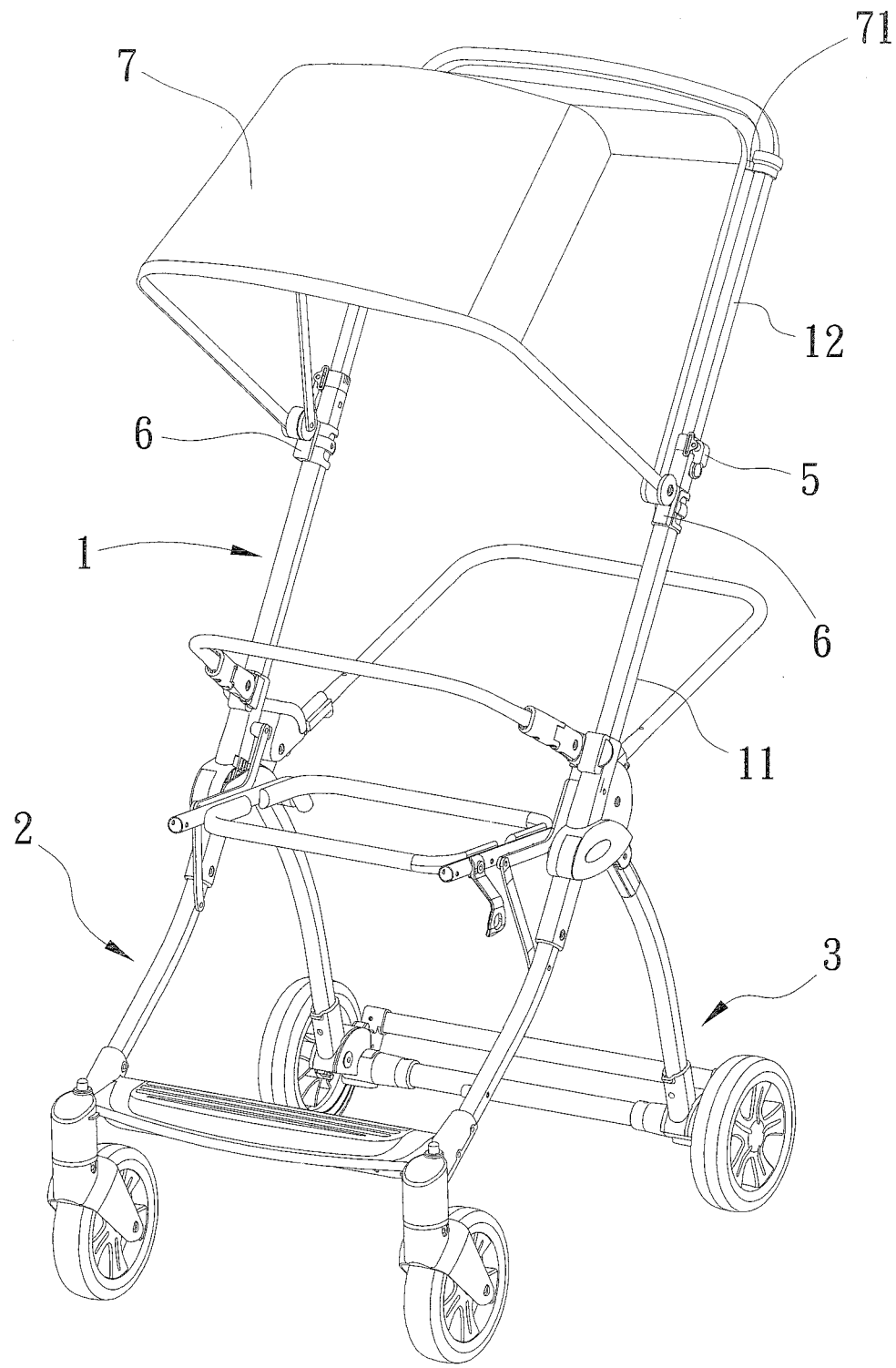
FIG. 1 is a perspective view of a baby stroller of an embodiment according to the present invention.
Figure 2:
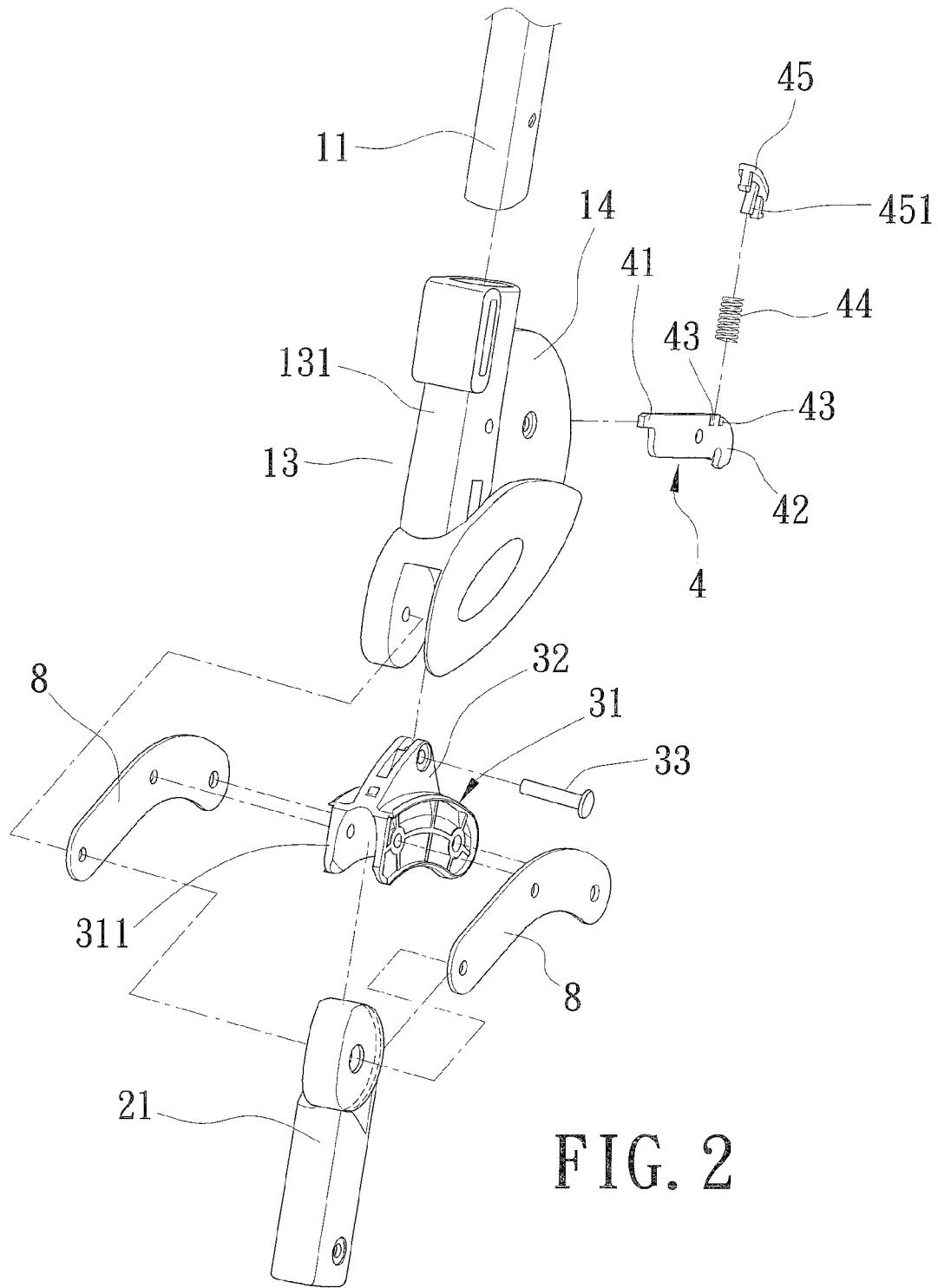
FIG. 2 is an explosive view of a locking mechanism for opening and folding a baby stroller of an embodiment according to the present invention.
Figure 3:
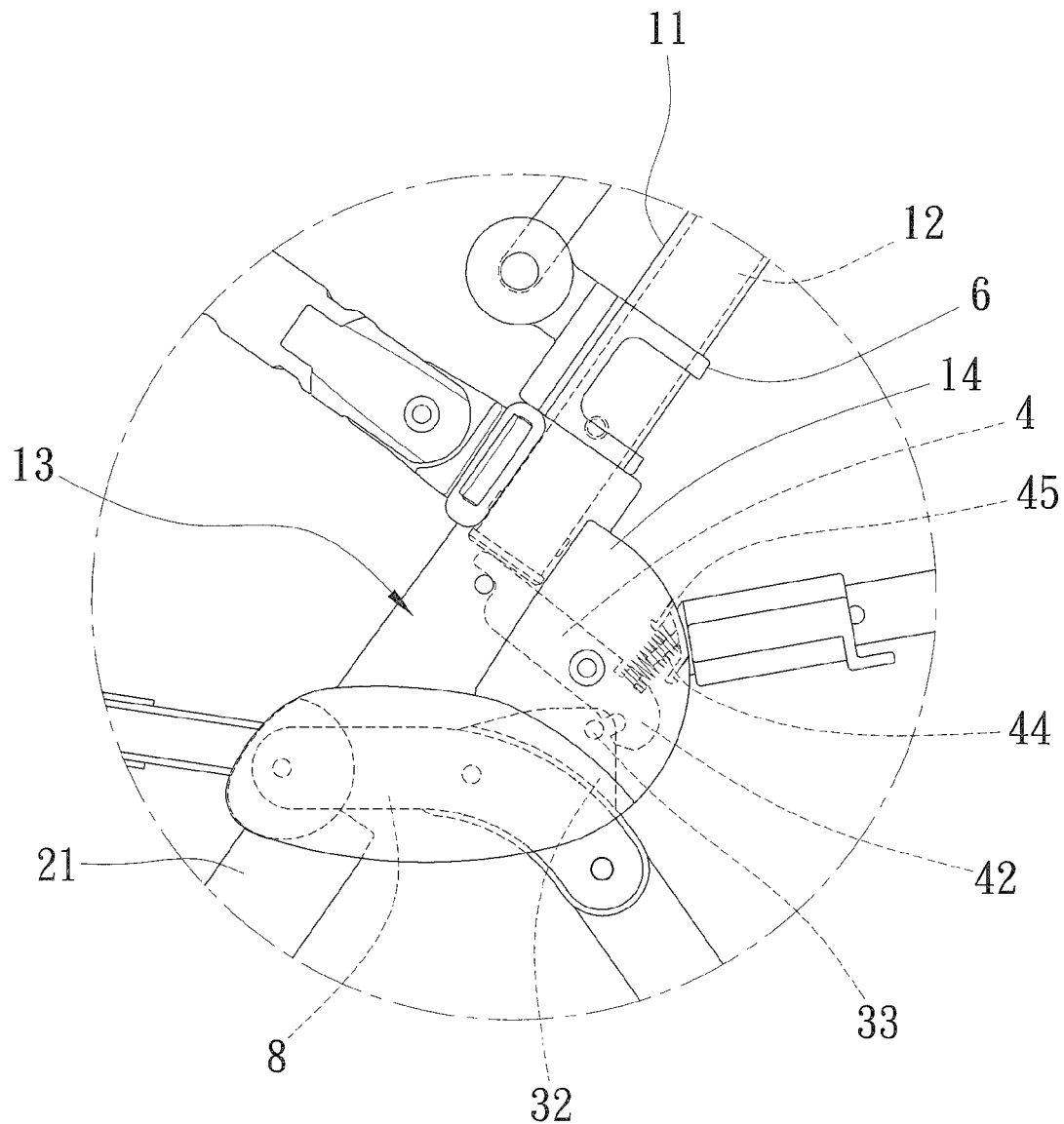
FIG. 3 is a partial enlarged side view of a locking mechanism for opening and folding a baby stroller in which an inner tube is moved downward of an embodiment according to the present invention.

Refer to FIG. 1, FIG. 2 and FIG. 3, a baby stroller includes a handle 1, a front wheel frame 2, a rear wheel frame 3, a locking hook 4, push buttons for folding 5, sliding sleeves 6, a stroller shade 7 and side pieces 8. The handle 1 consists of an outer tube 11 and an inner tube 12 mounted in the outer tube 11. At the unlocked state, the inner tube 12 is moveably extended from and retracted into the outer tube 11. A first pivot member 13, a second pivot member 21, and a third pivot member 31 are disposed on a lower end of the outer tube 11 of the handle 1, an upper end of the front wheel frame 2, and an upper end of the rear wheel frame 3 respectively. The second pivot member 21 is mounted into a front part of the first pivot member 13 while the third pivot member 31 is mounted into a middle part and a rear part of the first pivot member 13. A front part of the side piece 8 is coaxially connected to at least one side of the first pivot member 13 and the second pivot member 21 while a middle part of the side piece 8 is coaxially connected to a front part of the third pivot member 31. A rear part of the side piece 8 is coaxially connected to the rear wheel frame 3 and a rear part of the third pivot member 31. A hollow stopping frame 14 is arranged at a tube wall of a sleeve 131 of the first pivot member 13. The sleeve 131 is used for mounting and connected to the outer tube 11. A pair of lugs 32 is disposed on a tube wall of a sleeve 311 of the third pivot member 31 while the sleeve 311 is used for mounting and connection to the rear wheel frame 3. A locking rod 33 is horizontally arranged between the two lugs 32. When the baby stroller is in an extended/open state, the hollow stopping frame 14 is not only covered over the lugs 32 and the locking rod 33 but also engaged with the sleeve 311 of the third pivot member.

Refer to FIG. 2 and FIG. 3, the locking hook 4 consists of a first end 41, a second end 42 opposite to the first end 41, two locking slots 43 on a rear part of the second end 42, an elastic member 44, and a positioning cover 45. A middle part of the locking hook 4 is pivotally connected to the hollow stopping frame 14 of the first pivot member 13. The first end 41 is extended into the outer tube 11. One end of the elastic member 44 is fitted and positioned on the two locking slots 43 while the other end of the elastic member 44 is fitted and positioned on a positioning pin 451 projecting from positioning cover 45. Thus the elastic member 44 is fixed between the hollow stopping frame 14 and the locking hook 4. Without any external force applied, the second end 42 can be hooked on the locking rod 33 by an elastic force.

Figure 4:
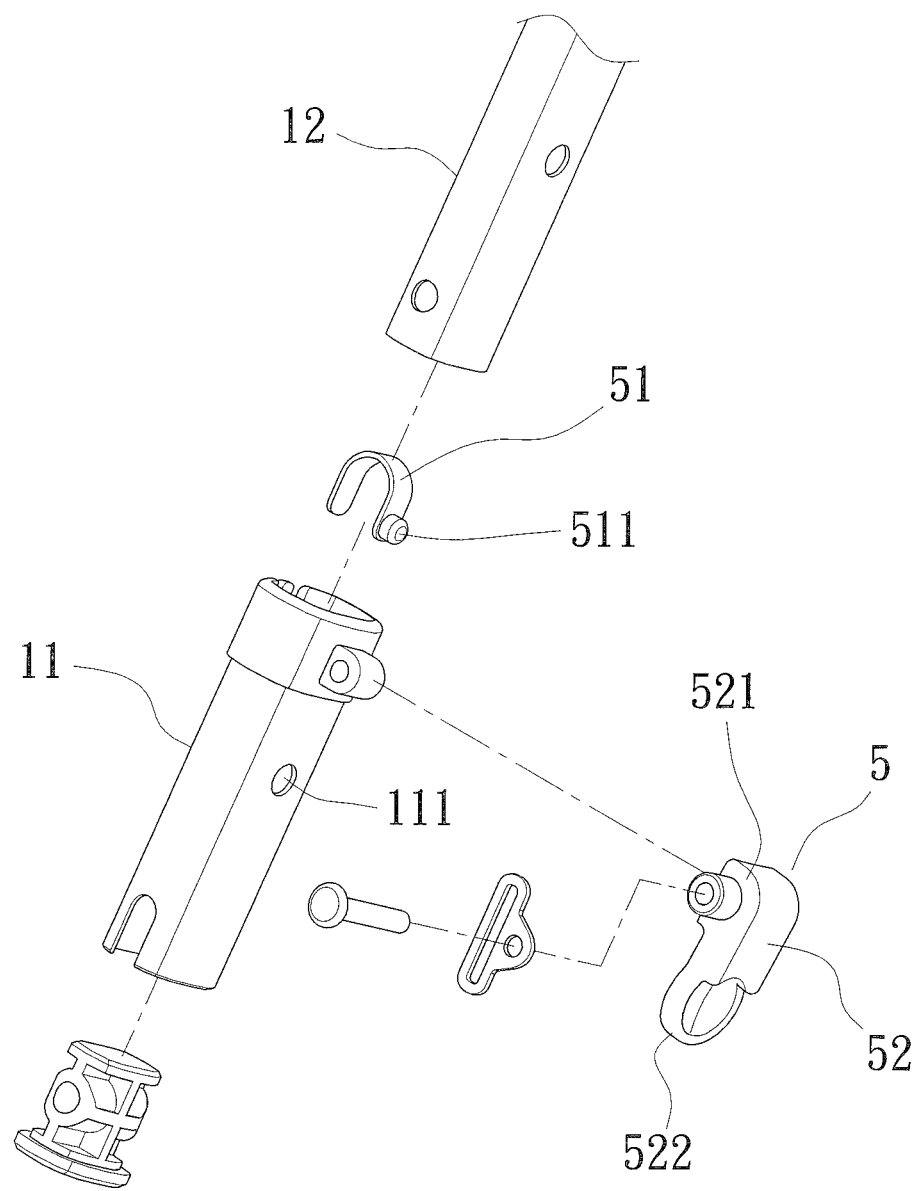
FIG. 4 is an explosive view of a push button for folding of a locking mechanism for opening and folding a baby stroller of an embodiment according to the present invention.
Figure 5:
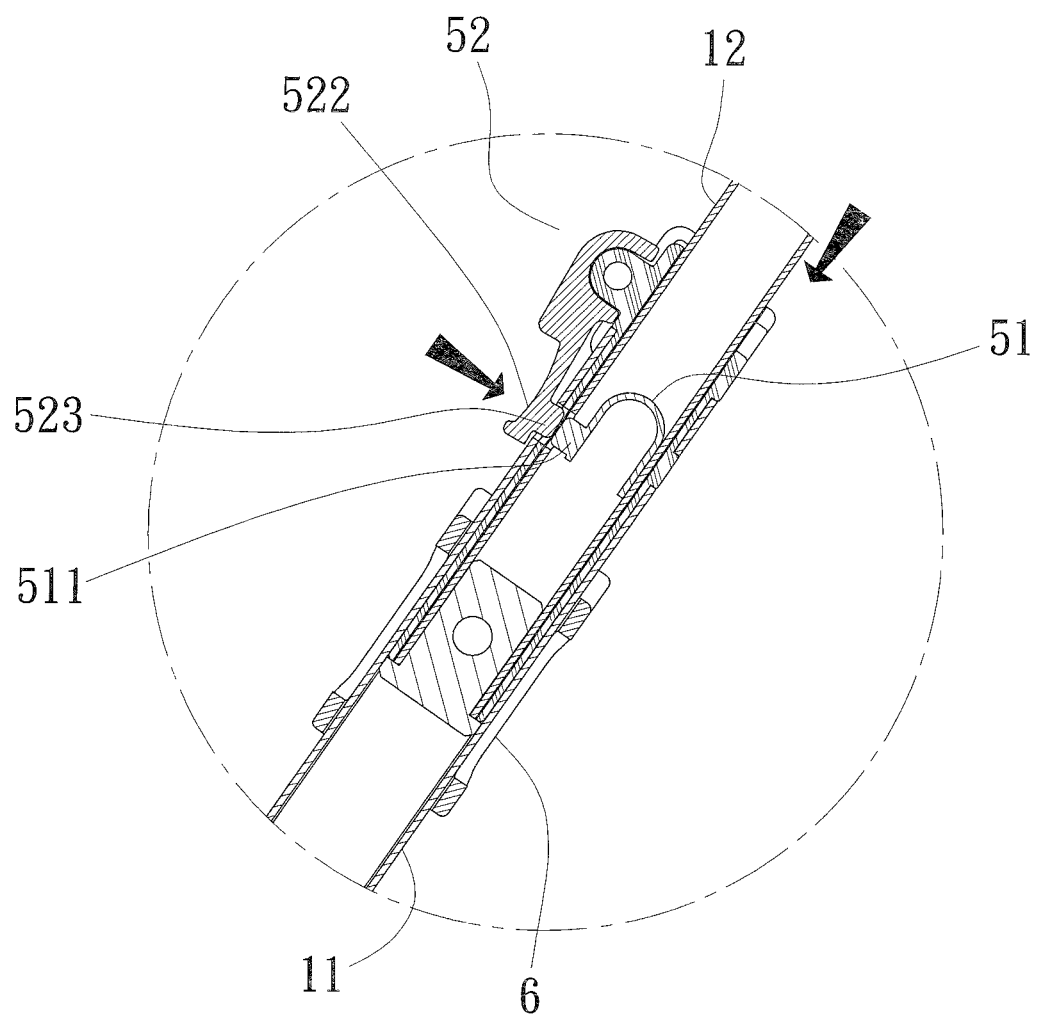
FIG. 5 is a side view of a push button for folding being pressed of an embodiment according to the present invention.

Refer to FIG. 4 and FIG. 5, the push button for folding 5 is arranged between the outer tube 11 and the inner tube 12. The inner tube 12 is movable vertically in the outer tube 11 and is controlled by the push button for folding 5. The push button for folding 5 is composed of a flexible member 51 and a main body 52. A bump 511 is set on a first end of the flexible member 51 and the bump 511 is passed through the inner tube 12 and the outer tube 11 for fixing the relative position of the inner tube 12 and the outer tube 11. The main body 52 consists of a pivot end 521 disposed on one end thereof, a press end 522 arranged at the end opposite to the pivot end 521, and a press block 523 that is set on the press end 522 and corresponding to the bump 511 of the flexible member 51. The pivot end 521 of the main body 52 is pivotally connected to the outer tube 11. The press block 523 is against the bump 511 of the flexible member 51 when the press end 522 is pressed. Thus the bump 511 is released from a hole 111 of the outer tube 12 and the inner tube 12 and the outer tube 11 are both unlocked.

Refer back to FIG. 3, a bottom end of the inner tube 12 presses the first end 41 of the locking hook 4 when the inner tube 12 is moved downward in the outer tube 11 to a certain degree. Thus the locking hook 4 is rotated around a pivot point where the locking hook 4 and the stopping frame 14 are connected. Therefore the second end 42 of the locking hook 4 is released from the locking rod 33.

Figure 6:
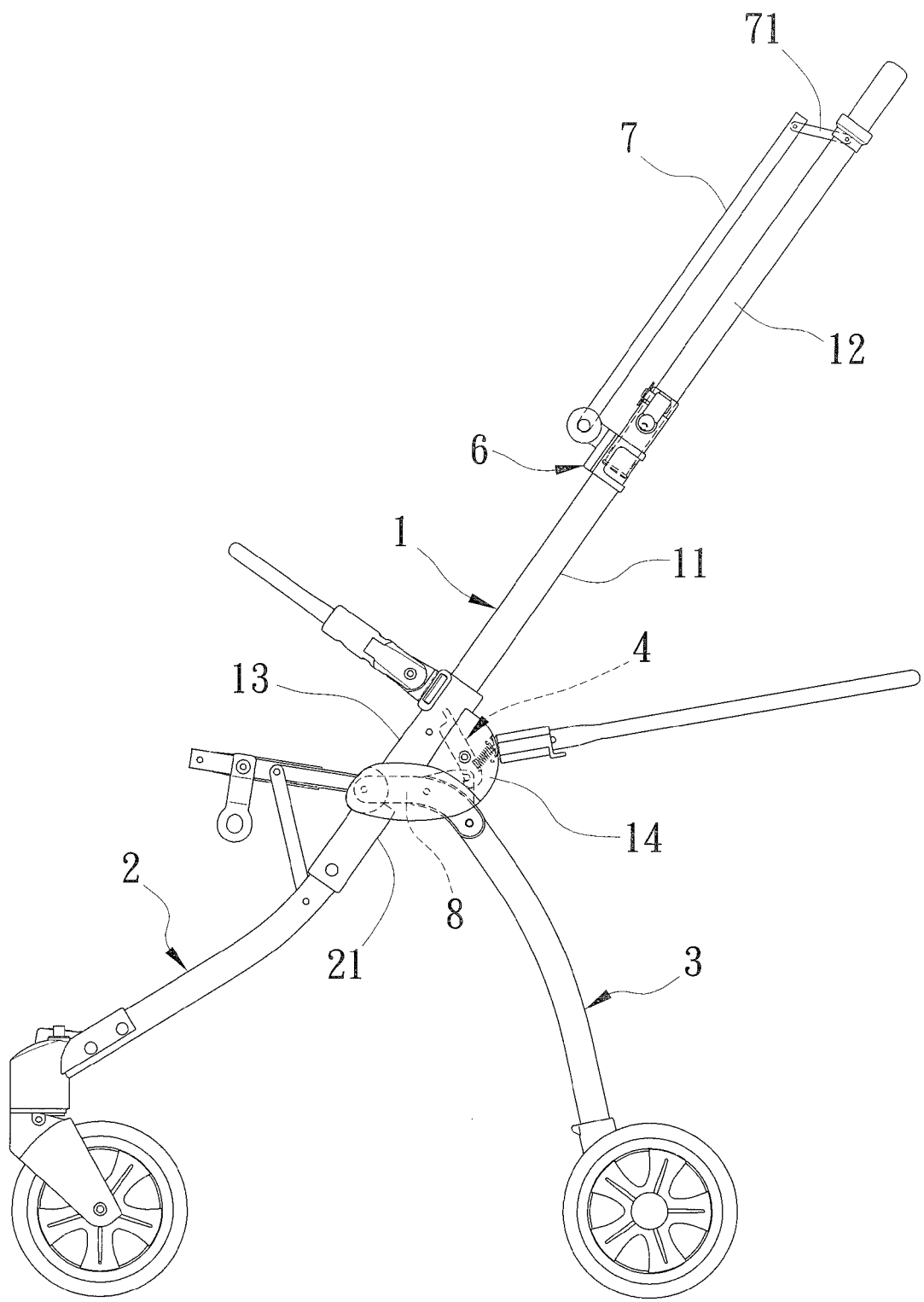
FIG. 6 is a side view of a baby stroller being opened of an embodiment according to the present invention.
Figure 7:
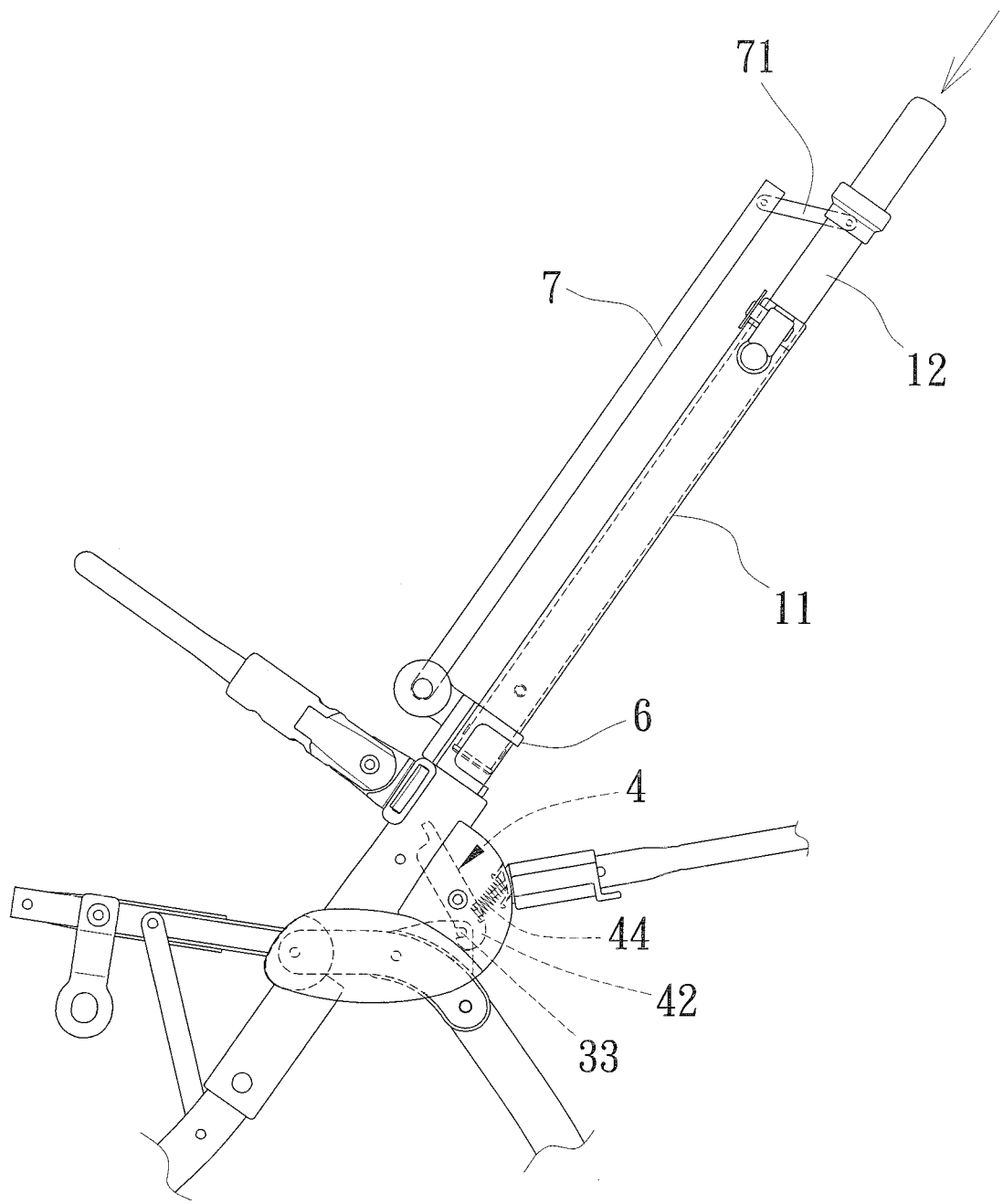
FIG. 7 is a partial side view of a locking mechanism for opening and folding a baby stroller while a baby stroller being folded of an embodiment according to the present invention.

Refer to FIG. 1, FIG. 6, and FIG. 7, the sliding sleeve 6 is arranged at and movable on the outer tube 11. The stroller shade 7 is connected to the sliding sleeves 6 and a top end of the stroller shade 7 is connected to the inner tube 12 by a connecting rod 71.

Figure 8:
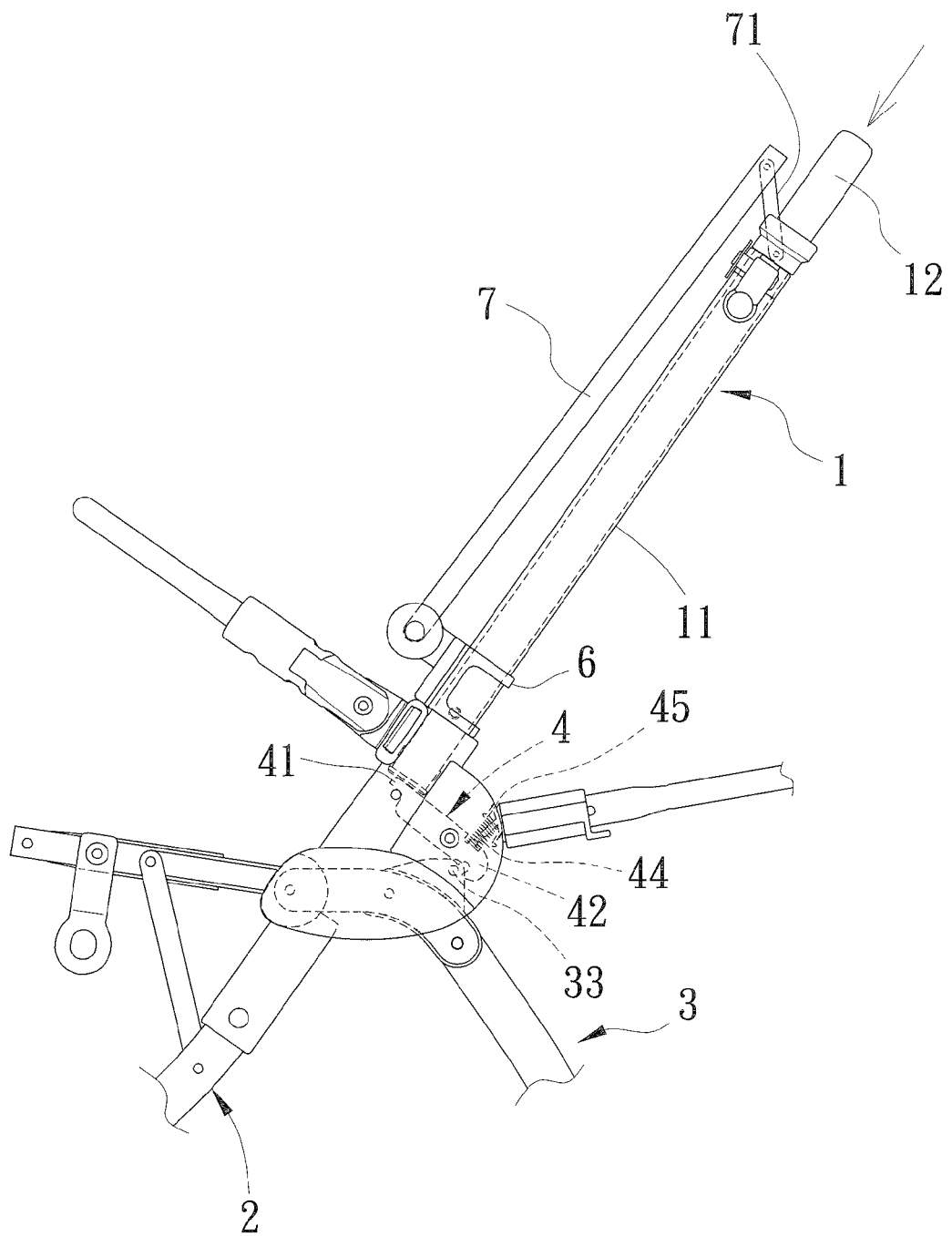
FIG. 8 is another partial side view of a locking mechanism for opening and folding a baby stroller while a baby stroller being folded of an embodiment according to the present invention.
Figure 9:
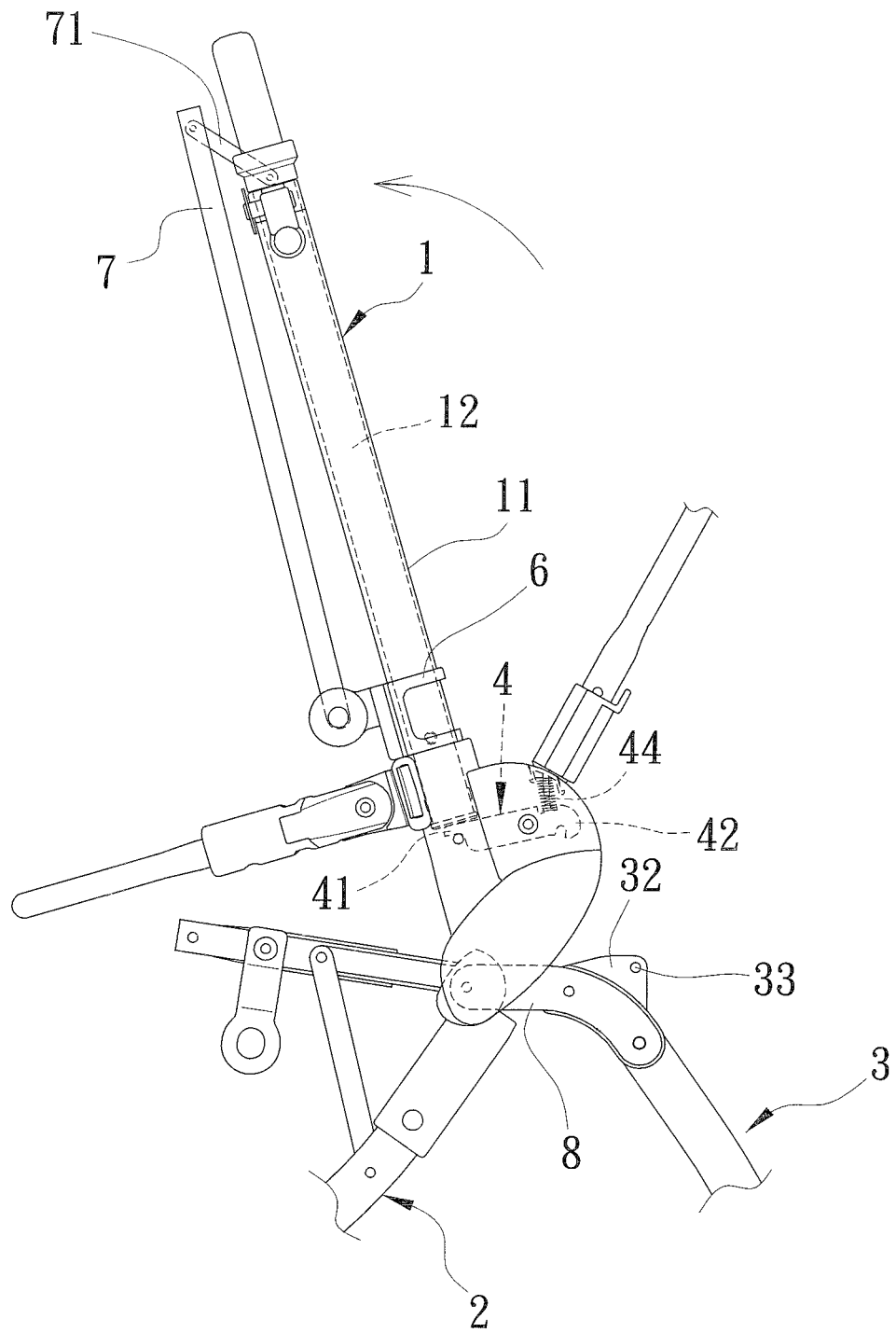
FIG. 9 is a further side view of a locking mechanism for opening and folding a baby stroller while a baby stroller being folded of an embodiment according to the present invention.

Refer to FIG. 5, the user firstly presses the push buttons for folding 5 for unlocking the baby stroller when the user intends to fold the baby stroller. The press block 523 is against the bump 511 of the flexible member 51 once the press end 522 is pressed down. Thus the bump 511 is released from the hole 111 of the outer tube 11 and moved into the inner tube 12. The inner tube 12 and the outer tube 11 are unlocked. Then refer to FIG. 7 and FIG. 8, the inner tube 12 is moved down and retracted into the outer tube 11 until the bottom end of the inner tube 12 presses the first end 41 of the locking hook 4. Thus the locking hook 4 is rotated around the pivot point where the locking hook 4 and the stopping frame 14 are connected, and the second end 42 of the locking hook 4 is released from the locking rod 33. Therefore the handle 1 is pushed forward around the pivot point where the first pivot member 13, the second member 21 and a front part of the side pieces 8 are connected. As shown in FIG. 9, the handle 1, the front wheel frame 2, and the rear wheel frame 3 are folded and the baby stroller is collapsed to a compact size. While the inner tube 12 is retracted into the outer tube 11, the stroller shade 7 is also moved along with the inner tube 12 due to the connecting rod 71 connected to the inner tube 12 and the sliding sleeve 6 moveable on the outer tube 11.

When the user wants to open the baby stroller for use, the handle 1 is moved backward around the pivot point where the first pivot member 13, the second member 21 and the front part of the side pieces 8 are connected so as to extend the front wheel frame 2 and the rear wheel frame 3. The front wheel frame 2 and the rear wheel frame 3 are positioned when a lower edge of the stopping frame 14 of the outer tube 11 of the handle 1 is in contact with and against an upper side of the tube wall of the sleeve 311 of the third pivot member 31. Then the inner tube 12 is pulled upward to free the first end 41 of the locking hook 4. Without any other external force applied to the first end 41, the second end 42 of the locking hook 4 is elastically pushed by the elastic member 44 to lock on the locking rod 33. Thus the baby stroller is opened and positioned completely.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A locking mechanism for opening and folding a baby stroller comprising:
    an outer tube of a handle disposed with a first pivot member,
    a front wheel frame arranged with a second pivot member, and
    a rear wheel frame set with a third pivot member;
    wherein the second pivot member of the front wheel frame is mounted into a front part of the first pivot member of the outer tube while the third pivot member of the rear wheel frame is mounted into a middle part and a rear part of the first pivot member of the outer tube; the first pivot member of the outer tube and the second pivot member of the front wheel frame are coaxially connected to a front part of a side piece while a middle part of the side piece is coaxially connected to a front part of the third pivot member of the rear wheel frame; a rear part of the side piece is coaxially connected to the rear wheel frame and a rear part of the third pivot member of the rear wheel frame;

wherein a middle part of a locking hook is pivotally connected to a stopping frame of the first pivot member of the outer tube and a first end of the locking hook is extended into the outer tube; a second end of the locking hook is hooked on a locking rod correspondingly while the locking rod is disposed on the third pivot member of the rear wheel frame; the handle further includes an inner tube mounted and movable in the outer tube; a push button for folding is arranged between the outer tube and the inner tube; the inner tube is moved downward in the outer tube until a bottom end of the inner tube presses the first end of the locking hook so that the second end of the locking hook is released from the locking rod and the baby stroller is folded; the stopping frame of the first pivot member of the outer tube and the third pivot member of the rear wheel frame are engaged with and stopped by each other so as to increase locking strength of the baby stroller being opened backward when the baby stroller is opened to use.

2. The mechanism as claimed in claim 1, wherein the stopping frame is covered over the locking hook and the locking rod while an elastic member is disposed between a rear part of the locking hook and the stopping frame for providing an elastic force that makes the second end of the locking hook hook onto the locking rod when no other external force is applied to the locking hook; the inner tube is moved downward in the outer tube until the bottom end of the inner tube presses the first end of the locking hook to release the second end of the locking hook from the locking rod and the baby stroller is folded; when the baby stroller is opened to use, the second end of the locking hook is pushed by the elastic force of the elastic member located between the rear part of the locking hook and the stopping frame to hook onto the locking rod; thus the baby stroller is opened and positioned while the inner tube is pushed upward and ready to use simultaneously.

3. The mechanism as claimed in claim 2, wherein a sliding sleeve is arranged at and movable on the outer tube while a stroller shade is connected to the sliding sleeve and a top end of the stroller shade is connected to the inner tube by a connecting rod; the stroller shade is moved downward or upward along with the inner tube due to the connecting rod when the inner tube is pushed downward or upward in the outer tube; thereby the baby stroller is folded or opened to use.

4. The mechanism as claimed in claim 1, wherein a sliding sleeve is arranged at and movable on the outer tube while a stroller shade is connected to the sliding sleeve and a top end of the stroller shade is connected to the inner tube by a connecting rod; the stroller shade is moved downward or upward along with the inner tube due to the connecting rod when the inner tube is pushed downward or upward in the outer tube; thereby the baby stroller is folded or opened to use.

* * * * *